Figure 1:
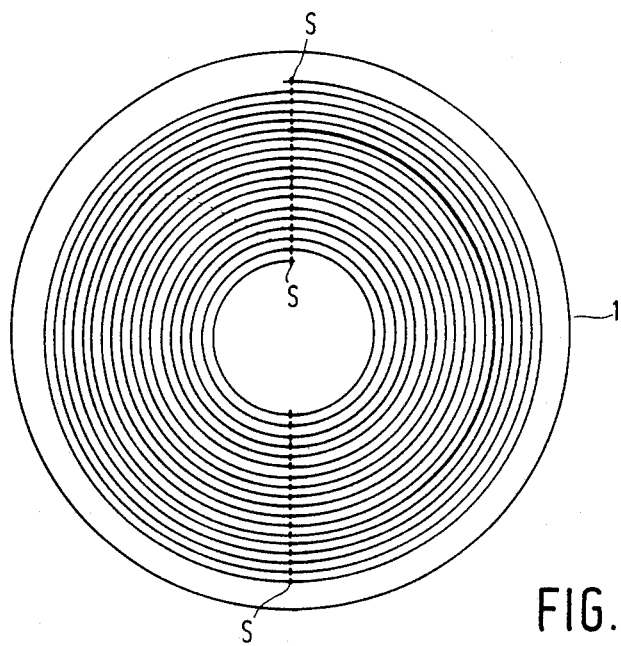

United States Patent [19]

Van Lier

[11] Patent Number: 4,750,055

[45] Date of Patent: Jun. 7, 1988

[54] RECORD CARRIER FOR STORAGE OF VIDEO INFORMATION

[75] Inventor: Johannes C. Van Lier, Eindhoven, Netherlands

[73] Assignee: U.S. Philips Corporation, New York, N.Y.

[21] Appl. No.: 758,933

[22] Filed: Jul. 25, 1985

[30] Foreign Application Priority Data

Apr. 25, 1985 [NL] Netherlands .......................... 8501189

[51] Int. Cl.[4] ............................................... G11B 7/00
[52] U.S. Cl. ...................................... 358/342; 360/73; 369/32; 369/33; 369/50; 369/133; 369/240
[58] Field of Search .......................... 360/73; 358/342; 369/32, 33, 47, 50, 133, 240

[56] References Cited

U.S. PATENT DOCUMENTS

| | | | |
|---|---|---|---|
| 4,492,992 | 1/1985 | Rooney et al. | 360/73 |
| 4,514,771 | 4/1985 | Stark et al. | 360/73 |
| 4,530,018 | 7/1985 | Hoshino et al. | 360/73 |
| 4,641,294 | 2/1987 | Yoshimara | 369/50 X |

Primary Examiner—Robert L. Richardson
Attorney, Agent, or Firm—Algy Tamoshunas

[57] ABSTRACT

A video disc is provided with tracks which are arranged in a plurality of sectors. The tracks in the sectors are divided into groups each containing an integral number of video fields recorded on an integral number of tracks. The tracks within a given sector are adapted to be played back at a constant angular velocity, with the angular velocity varying inversely with the radius from sector to sector.

8 Claims, 4 Drawing Sheets

| R | T | N | F |
|---|---|---|---|
| r0-r1 | 25 | 26 | 24.04 |
| r2-r3 | 5 | 6 | 20.83 |
| r4-r5 | 5 | 7 | 17.86 |
| r6-r7 | 5 | 8 | 15.63 |
| r8-r9 | 5 | 9 | 13.89 |
| r10-r11 | 5 | 10 | 12.50 |
| r12-r13 | 5 | 11 | 11.36 |
| r14-r15 | 5 | 12 | 10.42 |
FIG.6
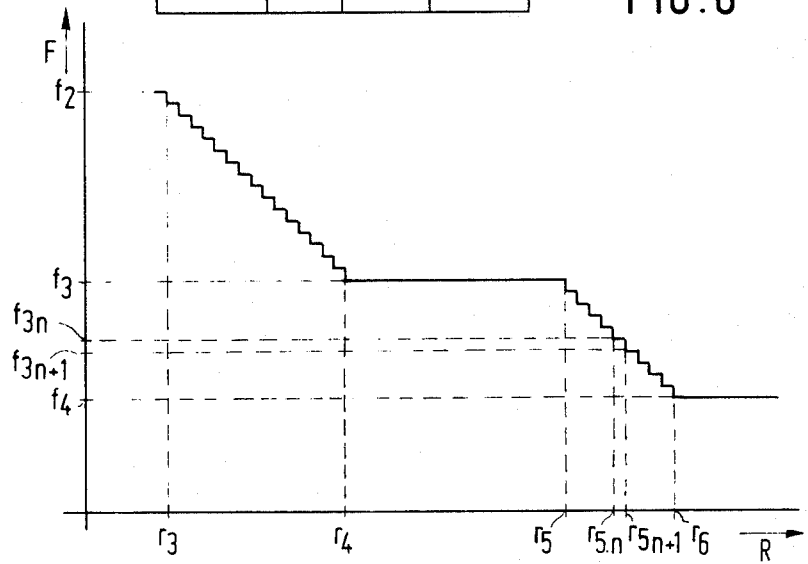
FIG.7
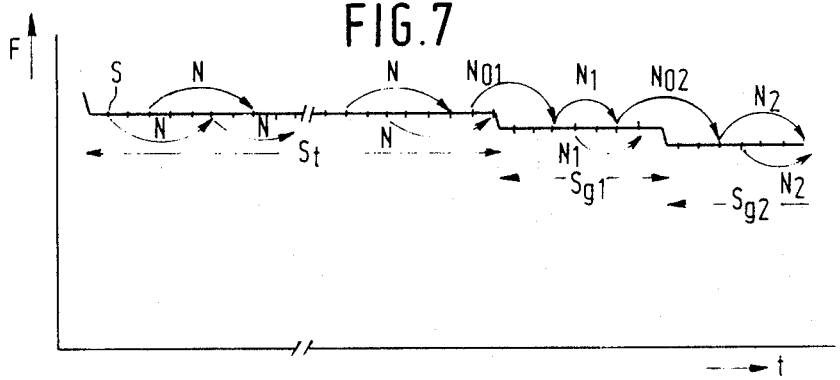
FIG.8

RECORD CARRIER FOR STORAGE OF VIDEO INFORMATION

The invention relates to a record carrier for storage of video information arranged in fields in substantially spiral tracks, the tracks being arranged on the record carrier in such a way that for a playing mode in which the fields succeed one another monotonically the velocity along the track is substantially linear, so that in such a playing mode the rate of revolutions is substantially inversely proportional to the playing radius. The invention also relates to an apparatus for playing such a record carrier and to an apparatus for manufacturing the record carrier.

Such a record carrier, playing apparatus and apparatus for the manufacture of a record carrier are known as the Laservision system. This system employs either of two modes:

the CAV mode (Constant Angular Velocity), in which during playback the record carrier is rotated at a constant rate of revolution in order to obtain a monotonic picture reproduction and in which one video picture (formed by fields) is recorded in every turn, and the CLV mode (Constant Linear Velocity), in which the record carrier is played back at a constant linear velocity, i.e. with a rate of revolution which is inversely proportional to the radius.

The CAV mode has the advantage in that all the field-synchronizing pulses are situated radially in line, so that special effects can be obtaining by changing track during the field-synchronizing pulses.

The CLV mode has the advantage in that the playing time is substantially longer because the information density is maximum for each radius, but has the disadvantage in that special effects are not possible.

It is the object of the invention to provide a record carrier, a playing apparatus and an apparatus for the manufacture of such a record carrier based on the CLV principle, which enables special effects to be obtained, though to a limited extent.

To this end the record carrier is characterized in that it is radially divided into at least two sectors within which an integral number of N fields are recorded on an integral number of T tracks. Each sector has a length equal to a multiple of T tracks, so that after every T tracks the field-synchronizing pulses are radially aligned to enable a jump of T tracks and, consequently, N fields to be made. The record carrier should be played with a constant rate of revolution within said sectors for monotonic reproduction, said sectors being separated by transitional areas in which the rate of revolution should be changed gradually.

The playing apparatus is characterized by means for playing said record carrier with a constant but different rate of revolution in each sector.

The apparatus for manufacturing such a record carrier is characterized by means for changing the rate of revolution of the record carrier on which the video signal is recorded sector by sector, in such a way that the record carrier is driven with a constant but different rate of revolution in each sector so that a constant number of N fields of the video signal is recorded in T tracks, such a sector being substantially longer than T tracks.

Figure 2:
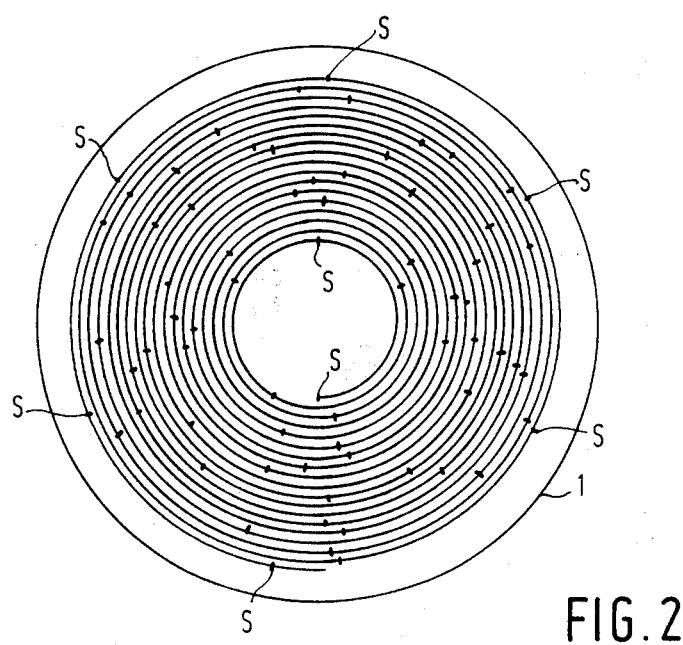
Figure 3:
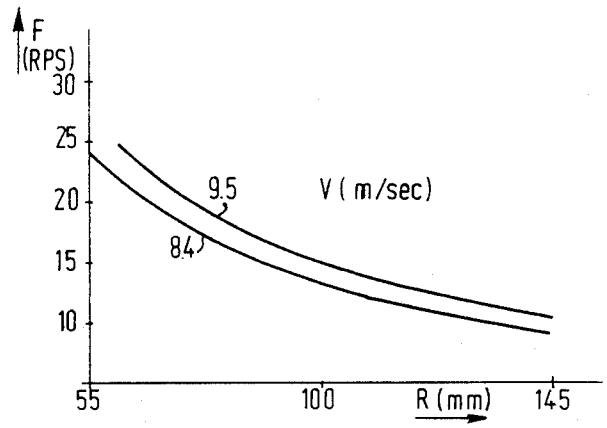
Figure 4:
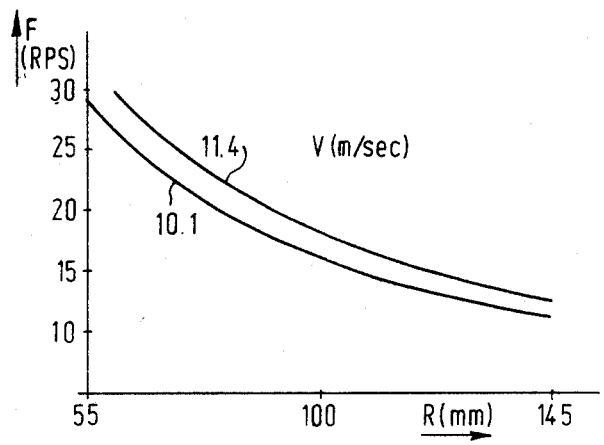
Figure 5:
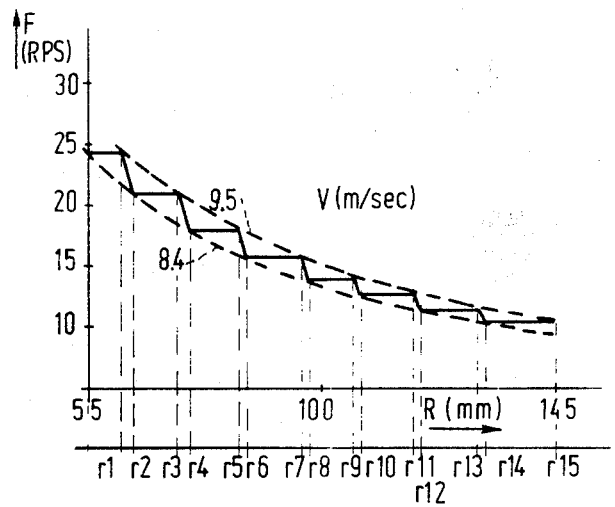
Figure 9:
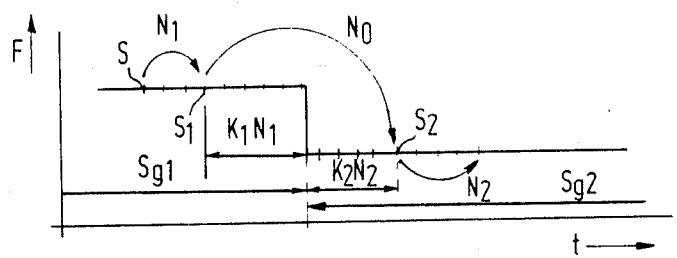
Figure 10:
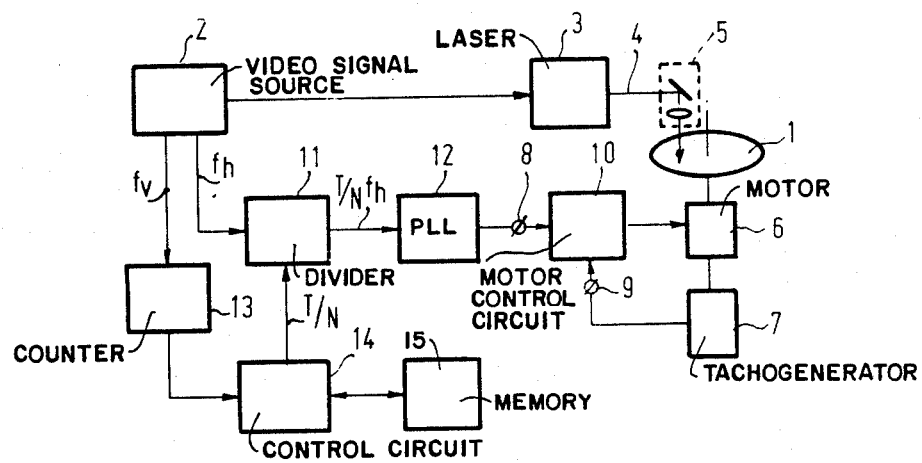
Figure 11:
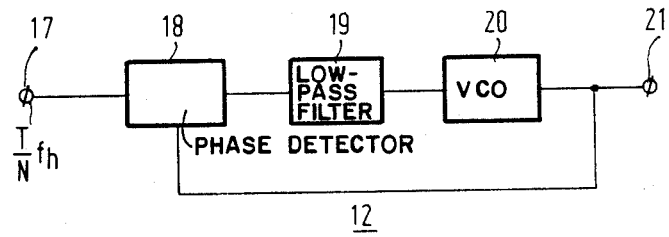

The invention will now be described in more detail, by way of example, with reference to the accompanying drawings, in which:

FIG. 1 shows the arrangement of the field-synchronizing pulses for a CAV disc,

FIG. 2 shows the arrangement of the field-synchronizing pulses in the case of a CLV disc, FIG. 3 represents the limits within which the rate of revolution F should remain during playing of a CLV disc with PAL signal coding, FIG. 4 represents the same limits in the case of NTSC signal coding, FIG. 5 illustrates the rate of revolution (F) as a function of the radius R for a record carrier in accordance with the invention, FIG. 6 is a table giving the values of the various parameters of a record carrier in accordance with the invention, FIG. 7 represents the rate of revolution F as a function of the radius R of a record carrier in accordance with the invention in more detail, FIG. 8 diagrammatically illustrates the special-effects possibilities with a record carrier in accordance with the invention, FIG. 9 diagrammatically illustrates the special-effects possibilities beyond the sector and segment boundaries for a record carrier in accordance with the invention, FIG. 10 shows an apparatus for manufacturing a record carrier in accordance with the invention, and FIG. 11 shows an example of the slow PLL 12 in the apparatus shown in FIG. 10.

FIG. 1 shows diagrammatically a disc-shaped record carrier 1 on which a spiral track 2 is recorded. The track contains optically detectable information in the form of video pictures each comprised of two fields, preceded by a field-synchronizing pulse. Each turn contains one video picture (2 fields). Such a disc is played with a constant angular velocity (CAV). The advantage of such a disc is that the field-synchronizing pulses S are radially aligned, so that a track change is possible at the location of the field synchronizing pulse without the picture/field synchronization being disturbed. This, in turn, makes it possible to obtain special effects, such as still picture, slow or fast forward or reverse motion, with a CAV disc. The disadvantage of such a CAV disc is that the information density is dictated by the angular velocity with which an acceptable picture can be recorded in or reproduced from the inner track. As a result of this, the information density decreases towards disc circumference and the total playing time is substantially shorter than the maximum attainable time.

FIG. 2 shows diagrammatically a similar record carrier 1 in which the pictures are recorded with a constant linear velocity (CLV). The instantaneous linear velocity is always such that the information density is the same as in the innermost track turn. The rate of revolution (F) thus varies as a function of the radius (R). Consequently, the playing time is extended substantially, but the field-synchronizing pulses S are no longer aligned, so that special effects are no longer possible.

For a commercially available disc of the CLV type, the rate of revolution F as a function of the radius R is standardized both for PAL (FIG. 3) and for NTSC (FIG. 4) and should remain within the specified limits in order to comply with the standard and in order to ensure that the servo control systems in the player can compensate for possible discrepancies in angular velocity during playback and during recording. As shown in the Figure, the linear velocity for PAL lies between 8.4 and 9.5 m/sec and for NTSC between 10.1 and 11.4 m/sec.

If a disc with a non-CLV recording is to be compatible with a CLV disc, the angular velocity during recording should be between the limits given in FIGS. 3 and 4. In accordance with a first aspect of the invention it is possible to obtain in each sector a constant angular velocity (CAV) within said limits, so that within the sectors special effects are possible, with the proviso that an integral number of N pictures can be accommodated within an integral number of T turns. With such an arrangement, a track change of T tracks is possible without the synchronization being disturbed. For example, 1 picture in 1 turn (N=1, T=1) in conformity with CAV can be provided in the first sector and, for example, five pictures in four tracks (N=5, T=4) can be provided in another sector. This should be effected in such a way that the angular velocity remains within the limits given in FIG. 3 or 4 and that the sector within which the angular velocity is constant is as large as possible, care being taken that the values of N and T remain acceptable. The rate of revolution F as a function of the radius R may then vary as is shown diagrammatically in FIG. 5. In the present example there are eight sectors with a constant rate of revolution, the values for F, T and N given in the table of FIG. 6 relate to the PAL standard. The rate of revolution F can be derived from the relationship:

$$F = \frac{T}{N} \cdot F_{start}$$

where $F_{start}$ is the rate of revolution during starting in the case of CAV, which is 25 revolutions/sec for PAL. The choice of N fields in 5 turns has been made because the number of lines per field in the PAL mode is divisible by 5, so that in each sector the line-synchronizing pulses are radially aligned and cross-talk of said line-synchronizing pulses into the visible part of the video picture is thus precluded.

The transitions between the sectors, for example the transition between $r_3$ and $r_4$ (FIG. 5) do not vary stepwise, because the rate of revolution cannot vary stepwise due to the limited accelerating power of the drive motor.

This means that not all the field-synchronizing pulses within these transitional areas are radially aligned. However, it is possible to adapt these transitions in such a way that special effects are also possible within these transitional areas. This is achieved by the use of segments with constant rates of revolution in said transitional areas. Those segments are substantially shorter than the sectors, namely in such a way that two specific field-synchronizing pulses on opposite sides of the transitions between the segments are situated in line, which enables jumping across the transition between said sectors. By way of illustration FIG. 7 shows a part of the diagram of FIG. 5 to a larger scale. A sector with a constant rate of revolution $f_3$ is situated between the radii $r_3$ and $r_5$ and the radius $r_6$ is followed by a sector with a constant rate of revolution $f_4$. The transition ($r_5$–$r_6$) is divided into a number of segments, for example between $r_{5,n}$ and $4_{5,n+1}$, with a constant rate of revolution $f_{3,n}$. The change-over proceeds with a specific acceleration, in such a way that at least two field-synchronizing pulses on opposite sides of said transition are radially aligned. However, within a segment several field-synchronizing pulses may be situated in line. The difference between segments and sectors will be clarified by means of FIG. 8, which shows the rate of revolution (F) as a function of time (t) around a sector St and around a segment Sg, the field-synchronizing pulses being marked S. During a segment, a jump of N fields (and consequently T tracks) is possible from every field-synchronizing pulse (except for the N last fields). During a sector, jumps of N fields are made. During a first segment $Sg_1$, a jump of $N_1$ fields is made, during a second segment $Sg_2$, a jump of $N_2$ fields is made, whilst across the transitions jumps over a number of fields $No_1$ and $No_2$ respectively, to be specified hereinafter, are made.

With respect to the possibility for the jumps $N_o$ the rate of revolution during recording should be such that after a specific number of fields the phase of the field-synchronizing pulses has changed by an integral multiple of $2.\pi$. For this purpose various functions for varying the rate of revolution are available, such as a variation with constant acceleration, a variation with two successive constant accelerations, and a variation in accordance with a curve defined by a polynomium or an arc of circle. However, a very simple method is the use of a slow phase-locked loop (PLL). A clock signal Fc which is in synchronism with the field-synchronizing pulses is generated and is stepwise brought at a frequency corresponding to the desired velocity in the following segment $Sg_2$. The PLL ensures that a signal Ft of gradually varying frequency is generated, which is followed by the drive-motor servo control until the rate of revolution F is again in synchronism with the clock signal. If this speed variation is completed before the field-synchronizing pulse $S_1$ to which the jump across the transition is made appears, the phase relationship of said pulse $S_1$ with the field-synchronizing pulses in the preceding segment $Sg_1$ is dictated by the jump in frequency of the clock signal.

FIG. 9 represents a rate of revolution defined by the clock signal, i.e. with an abrupt change, which in reality is followed by the actual rate of revolution with a gradual transition, as a function of time t.

During the segment $Sg_1$, the field-synchronizing pulses S are radially aligned after every $N_1$ pulses and, during the segment $Sg_2$, after every $N_2$ pulses. The field-synchronizing pulse $S_1$, from which the jump $N_o$ across the transition is made, is situated $K_1S_1$ pulses before the instant of the transition, whereas the pulse $S_2$ to which the jump is made, is situated $K_2N_2$ pulses after the jump, $K_1$ and $K_2$ being integers. The phase variation is then $(K_1N_1+KN_2) \cdot 2\pi$ and since $K_1$, $N_1$, $K_2$ and $N_2$ are integers, it is an integral multiple of $2\pi$ or, in other words, the pulses $S_1$ and $S_2$ are radially aligned. In order to ensure that the jump commences as late as possible, $K_1$ may be chosen to be one. However, the integer $K_2$ should be selected in such a way that the PLL can follow the jump.

The lengths of the sectors and segments can be computed and stored in a look-up table together with the associated rates of revolution to be used during the manufacture of the master disc, for which purpose said clock signal $F_c$ can be generated in conformity with said table, starting from, for example, the horizontal synchronizing pulses. By storing the factors N and T in said table, said frequency $F_c$ can be generated by means of dividers set in conformity with the factors N and T. Indeed, the rate of revolution F is equal to T/N $F_{start}$. The frequency of the clock signal then also complies with T/N.$f_{start}$, where $f_{start}$ is a starting frequency equal to for example one fifth of the horizontal synchronizing frequency $F_h$.

FIG. 10 shows an example of an apparatus for recording video signals with a field alignment as described in the foregoing on a (master) disc. In this Figure a source 2, for example, a video reproduction apparatus which reproduces video pictures from a magnetic tape, supplies a video signal to a laser 3 which is modulated so that the laser beam 4 is pulse-width modulated with the video signal. By means of an objective system 5, which can be controlled in a radial direction (relative to the axial or disc 1) and the focusing direction, beam 4 is projected on the disc 1 so as to record the information in a spiral track. The disc is driven by a motor 6 coupled to a tachogenerator 7. The motor 6 is controlled by a rotation servo-control circuit 10 having a first input 8 which receives speed control information, a second input 9 which receives the speed information from the tachogenerator 7, and which may comprise, for example, a PLL.

In order to generate a speed control signal, the source 2 applies a clock signal $f_h$, for example, the line sync of the video signal, to a divider circuit 11. The frequency of the clock signal is multiplied in the divider by a factor which is proportional to the fraction T/N, yielding a signal of a frequency proportional to T/N $F_{start}$. This signal is applied to a slow PLL 12, which supplies a signal whose frequency follows the frequency which is proportional to T/N $F_{start}$, but whose frequency variation is finite, so that the motor 6 brings about a desired speed variation with a specific maximum acceleration.

In order to control the fraction T/N a counter 13 receives the field-synchronizing pulses $f_v$ from the source 2. The counter 13 consequently provides a measure of the variation of the video signal as a function of time. A memory 15 stores the values of T/N as a function of the count of the counter 13 and, depending on the count and the value of T/N corresponding to said count, a control unit 14 controls the multiplier 11, so that each time that the fraction T/N varies suddenly because a following sector or segment is reached, the frequency of the output signal of the circuit 11 will exhibit a jump to which the slow PLL 12 responds gradually.

The slow PLL 12 may be as shown in FIG. 11. The input signal T/N $f_h$ is applied to a phase detector 18 via an input 17. The detector also receives the output signal of a voltage-controlled oscillator 20. The measured phase difference controls the voltage-controlled oscillator 20 via a low-pass filter 19, so that the oscillator 20 follows the signal on the input 17 only slowly in the case of sudden frequency variations.

A record carrier recorded in accordance with the foregoing can be played directly by conventional Laservision players, because the variations in the rate of revolution remain within the limits given in FIGS. 3 and 4. However, for special effects, a modified player may be employed, for example comprising a look-up table with the sector and segment data (T/N as a function of the radius). However, since radius-detection is often difficult and since the jumps across the sector transitions involve a different number of fields, it is advantageous to add information about jumps which are possible from each field to the picture coding associated with said field, which information can be decoded by means of the playing apparatus.

I claim:

1. A disc-shaped record carrier for storing a video signal comprised of a sequence of fields and field synchronization pulses, said video signal being recorded in a plurality of generally circular tracks which extend about the center of said record carrier, said tracks being arranged into sectors with the video signal in each sector being adapted to be played back at a substantially constant, predetermined rate of revolution of said record carrier, said rate of revolution varying from sector to sector inversely with the radius, the tracks in each sector being divided into a plurality of groups each containing a plurality of integral fields recorded on a plurality of integral tracks, said field synchronization pulses being radially aligned after every group of tracks so as to enable jumps between groups within a given sector to be made during playback, said sectors being separated by transitional areas containing tracks from which said video signal is played back at a rate of revolution which changes gradually from a given predetermined rate of revolution associated with a preceding sector to the predetermined rate of revolution associated with the next sector.

2. A record carrier as claimed in claim 1 wherein said tracks in said transitional areas are divided into segments each containing an integral number of tracks with an integral number of fields such that after every transition between two segments or between a sector and a segment, a specific field synchronizing pulse is radially aligned with a field synchronizing pulse preceding said transition so as to enable said video signal to be played back from a given segment at a constant rate of revolution which varies from segment to segment and to enable jumps between segments or between a segment and a sector.

3. A record carrier as claimed in claim 2 wherein the video signal contains information relating to the location of said specific field-synchronizing pulse after such a transition.

4. A record carrier as claimed in claim 3, wherein the video signal also contains information relating to the number of tracks in said segments and/or groups.

5. An apparatus for recording a video signal comprised of a sequence of video fields and field synchronization pulses on a disc shaped record carrier, said apparatus comprising means for rotating said record carrier about a central axis, means for recording said video signal on said record carrier during rotation thereof so as to record said video signal in generally circular tracks which extend about said central axis, and means for controlling the rate of rotation of said record carrier so that the video signal is recorded on said record carrier in a plurality of sectors, said controlling means controlling said rotating means such that said video signal is recorded in a given sector at a constant, predetermined rate of revolution which is different for each sector, the tracks in each sector being divided into at least two groups each having a plurality of integral fields recorded in a plurality of integral tracks such that said field synchronization pulses are radially aligned after every group so as to enable jumps between groups within a given sector to be made during playback of said video signal, said controlling means further controlling said rotating means such that, in transitional areas between said sectors, said video signal is recorded in tracks at a rate of revolution which changes gradually from a given predetermined rate of revolution associated with a preceding sector to the predetermined rate of revolution associated with the next sector.

6. An apparatus as claimed in claim 5, wherein said controlling means controls said rotating means such that when said video signal is recorded in said transitional areas between said sectors, said rate of rotation is changed by steps so that said video signal is recorded with a constant rate of revolution in each of a plurality of segments, each segment having an integral number of tracks containing an integral number of fields, the rate of revolution varying in steps from segment to segment so that after each stepwise change in the rate of revolution, a specific field synchronizing pulse is recorded which is radially aligned with a specific field synchronizing pulse in a preceding segment or sector.

7. An apparatus according to claim 6, wherein said rotating means includes a motor for rotating said record carrier and said controlling means includes a slow phase locked loop, means for applying, to said phase locked loop, a signal with a frequency which varies in steps corresponding to the desired variation in the rate of revolution between said segments or between a sector and a segment, and a control circuit which controls the rate of revolution of said motor in response to said phase locked loop so that the rate of revolution gradually follows the stepwise variation in the frequency of said signal applied to said phase locked loop.

8. An apparatus as claimed in claim 7, wherein said frequency step is applied $N_1$ fields after a specific field-synchronizing pulse in a given sector or a given segment and $KN_2$ fields before a specific field-synchronizing pulse in a subsequent sector or segment, where $N_1$ is the number of integral fields in a group of said given sector or in said given segment, $N_2$ is the number of integral fields in a group of said subsequent sector or segment and $K$ is an integer, so that said two specific field-synchronizing pulses, which are situated at a distance corresponding to $N_1+KN_2$ from each other, are radially aligned.

* * * * *